United States Patent [19]
Wakasugi

[11] Patent Number: 5,628,106
[45] Date of Patent: May 13, 1997

[54] METHOD OF MANUFACTURING MAGNETIC HEAD

[75] Inventor: Makoto Wakasugi, Tokorozawa, Japan

[73] Assignee: Citizen Watch Co., Ltd., Tokyo, Japan

[21] Appl. No.: 261,963

[22] Filed: Jun. 17, 1994

[30] Foreign Application Priority Data

Jun. 22, 1993 [JP] Japan ................... 5-174784

[51] Int. Cl.$^6$ ............... G11B 5/127; G11B 5/235; C03C 29/00
[52] U.S. Cl. .................. 29/603.11; 29/603.21; 360/120; 65/30.13; 65/36; 65/43; 65/59.1; 65/60.8
[58] Field of Search ............... 65/30.13, 33.5, 65/43, 42, 58, 59.1, 36, 60.8, 60.5, DIG. 8; 29/603, 603.11, 603.21; 360/120

[56] References Cited

U.S. PATENT DOCUMENTS

| | | | |
|---|---|---|---|
| 3,912,483 | 10/1975 | Sugaya et al. | 65/43 |
| 4,238,215 | 12/1980 | Yokoyama et al. | 29/603 |
| 4,351,104 | 9/1982 | Klagane et al. | 29/603 |
| 4,670,972 | 6/1987 | Sakakima | 29/603 |
| 4,821,405 | 4/1989 | Gukkenberger et al. | 65/43 |
| 4,847,983 | 7/1989 | Satomi et al. | 29/603 |
| 4,885,020 | 12/1989 | Nishino et al. | 65/122 |
| 4,891,878 | 1/1990 | Kawai et al. | 29/603 |
| 5,086,553 | 2/1992 | Goto et al. | 29/603 |

FOREIGN PATENT DOCUMENTS 56-137517 10/1981 Japan ................... 29/603

*Primary Examiner*—Donald E. Czaja
*Assistant Examiner*—Steven P. Griffin
*Attorney, Agent, or Firm*—Oliff & Berridge

[57] ABSTRACT

In a first glass bonding process, a silicon-dioxide layer is formed on either a first or second magnetic material by vacuum evaporation. The first or second magnetic material with the silicon-dioxide layer is dipped in a warm solution containing alkali sodium or potassium for a predetermined period of time. Alkali metal is diffused on a surface of the silicon-dioxide layer to form a glass layer thereon, thereby bonding the first and second magnetic materials.

12 Claims, 9 Drawing Sheets

METHOD OF MANUFACTURING MAGNETIC HEAD

BACKGROUND OF THE INVENTION

1. Field of the Invention

This invention relates to a method of manufacturing a read/write head for writing information into a magnetic recording medium or reading information therefrom, and an erase head for erasing information written in the magnetic recording medium, and more particularly to a method of joining two magnetic members with a predetermined space kept therebetween.

2. Description of Related Art

Recently, a floppy disk drive of 3.5-inch 135TPI (Track per Inch) type has been in wide use. A magnetic head for such a drive is mainly of a tunnel erase and bulk type. This trend is anticipated to continue in the future. Floppy disks having a 2-Mega byte storage capacity are very popular, and will remain so in the future.

In this state, one of the market's main concerns is to obtain less expensive magnetic heads whose quality is maintained as usual.

Referring to FIGS. 1 to 3, a method of manufacturing a conventional magnetic head core with a two-piece slider will be described hereinafter. FIG. 1 is a perspective of a core viewed from above. FIG. 2 is a perspective view of the core in an inverted posture. FIG. 3 is a perspective of a core chip viewed from above.

The magnetic head including a two-piece slider as shown in FIGS. 1 to 3 has been widely employed up to now. The two-piece slider has large and small sliders 41 and 42, both of which sandwich a core chip 43 therebetween. The sliders 41 and 42 are cut from a large ceramic block by using a diamond wheel. Alternatively, they are obtained through powder compression molding or an injection molding process, and are joined together to hold the core therebetween. Both of the foregoing methods are unfortunately rather expensive.

Further, the large and small sliders 41 and 42 are bonded by a material such as an organic adhesive with the core chip 43 sandwiched therebetween. Therefore, since the large and small sliders and the core chip have different coefficients of friction on their confronting surfaces, there is a problem that lower surfaces 41a, 42a and 43a of the members 41, 42 and 43 are not on the same plane. This phenomenon is called "CS level difference" hereinafter. The CS level difference is variable in the order of approximately 20 µm.

As is well-known, a recording/reproducing gap width (called "GD" hereinafter) is an important factor for determining the quality of the electromagnetic conversion characteristics. In FIG. 3, numeral 43b denotes GD. In order to assure a precise GD, a top surface of a core 44, defined by the large and small sliders 41 and 42 and the core chip 43, is ground. Several hundred cores 44 are arranged with their top surfaces upward and are ground simultaneously.

To prevent the cores 44 from having different GDs, it is important that a distance (43c shown in FIG. 3) between the lower surface of the core 44 and the lower end of the gap, i.e. back height of the core chip, should be uniform for all the core chips, that the CS level differences should be small, and that the cores 44 should be adhered to a GD processing plate in such a manner that an adhesive is applied in a uniform thickness.

A tolerance for the GD dimension should be practically within ±10 µm of a proper value for the storage capacity of 2 MB. If a CS level is variable in a range of 20 µm, it would become equal to the tolerance ±10 µm for the GD dimension. For that reason, each core chip has to be ground in the order of 4 to 5 µm with respect to the CS level differences. Thus, the core chips have to be processed after they are sorted according to their CS level differences.

Since the number of cores whose CS levels are variable near borders of the foregoing ±10 µm range is relatively few, they should be stocked until they reach a predetermined quantity (e.g. several hundreds). In other words, such cores should be stocked and controlled as well as they are sorted.

Further, there are very few cores of which CS level differences and GDs are outside the foregoing ±10 µm ranges. These cores have to be discarded, which would reduce an yield ratio of usable cores and prevent cost reduction.

Since stresses are applied to lower surfaces 43a, 41a and 42a of the core chips 43 and sliders 41 and 42 while they are hierarchically sorted according to the CS values, they would be damaged or cracked. Even when they do not apparently seem damaged or cracked, they would be prone to poor quality because of residual distortion therein or other factors.

When the large and small sliders 41 and 42 are bonded, by an adhesive, with the core chip 43 sandwiched therebetween, the surfaces to be bonded should be kept clean to a predetermined level to assure reliable bonding. Practically speaking, it is extremely difficult to provide a 100% bonding force. This is because there is a risk that the bonding surfaces might be stained since the bonding is manually carried out.

There is a rare instance in which joined surfaces are cracked to make cores fatally defective. There are some cores in which sliders 41 and 42 and core chips 43 are minutely displaced with respect to one another. This phenomenon is called "displacement". Since the displacement is very minute (e.g. 0.001 µm to 0.3 µm), it is very difficult to visually detect such a defect.

Specifically, if the phase shift is 0.01 µm or less, the electromagnetic conversion characteristics of the core are not lowered remarkably. Such a core can probably pass an electromagnetic conversion characteristic test. If a magnetic head having such a core undergoes a medium wear test in which the medium is sought one million times, the magnetic material on the medium might be scraped away.

To overcome the foregoing problems related to the sliders and core chip bonded by the adhesive, there is a method to bond the sliders and core chip by glass. This method is free from the foregoing problems such as cracks and phase shift of bonded surfaces, but is prone to a problem that large and small sliders 61 and 62 should be formed with channel-shaped grooves 61a and 62a on their surfaces to be joined so as to receive bonding glass 64 in a minute space (1 µm to 2 m) between the sliders 61 and 62 and the core chip 43. This process is very delicate and cumbersome.

Recently, a magnetic head having a one-piece slider as shown in FIG. 5 has been developed to overcome the foregoing problems of the magnetic head having the two-piece slider. In FIG. 5, reference numeral 15 denotes a one-piece slider 15 produced by the injection molding process. A bulk type core chip blank 17 is fitted into a long opening 16 on the one-piece slider 15, and is fixed therein with a melted glass rod 18. Thus, the magnetic head including the one-piece slider is free from the problems such as the CS level difference, damage of the portion between the core chip and the sliders, degraded electromagnetic conversion characteristics due to the displacement and scraping of the magnetic material from the medium, which are inevitable with magnetic heads with two-piece sliders.

However, there has arisen a new problem which is not significant when the core chip and sliders are bonded by the organic adhesive. This problem relates to a process of manufacturing core chips.

Referring to FIG. 6(A), a core chip will be manufactured as follows. As shown, a first magnetic material 21 for read/write and erase heads and a second magnetic material 22 are placed on a jig in a manner such that their contacting surfaces 21a and 22a confront each other via at least one spacer partially inserted therebetween so as to keep a predetermined gap g. Next, cylindrical glass rods 25 are melted to join the two magnetic materials 21 and 22 to form a bar material 27 as shown in FIG. 6B. Alternatively, as shown in FIG. 7(A), a silicon dioxide layer 23 (called "$SiO_2$ layer 23"), whose thickness corresponds to approximately three quarters of the gap width, is formed on the surface 21a of the first magnetic material 21 by a vacuum evaporation process or a sputtering process. Then, a glass layer is sputtered on the $SiO_2$ layer 23 in the width of approximately a quarter of the gap width g. Thereafter, the cylindrical glass rod 25 is melted to obtain the bar material 27 for the read/write and erase heads. This process for forming the bar material 27 is called "the first glass bonding process".

Referring to FIG. 8, head materials 6 and 7 which include track regulating grooves 6a and 7a thereon and are of level height are arranged in a manner such that first magnetic materials 1 of the head materials 6 and 7 confront each other with a minute gap 8 (called "center shield") kept therebetween by a thin glass plate 9 which is inserted in the lower part of the minute gap 8. The head materials 6 and 7 confront each other so as to let track regulating grooves 6a and 7a have a predetermined positional relationship. At this time, the head materials 6 and 7 are temporarily bonded at their lengthwise ends by a non-organic heat-resistant adhesive 10 such as ARON CERAMIC (trade name). Thereafter, a glass rod 11 having an oval section is placed on the head materials 6 and 7, and is heated and melted, thereby forming a core material 12. This process is called "the second glass bonding process".

The core material 12 is then cut and ground at a right angle along its length to obtain a bulk type core chip blank 17. This core chip blank 17 is inserted into the long opening 16 of the one-piece slider 15 which has been injection-molded. Thereafter, a cylindrical glass rod 18 is placed on the one-piece slider 15, and is melted to join the core chip blank 17 and the one-piece slider 15. This process is called "the glass molding process". When the glass is used, there are three process as described above.

In the first and second glass bonding processes and the glass molding process, it is assumed that the glass rods 25, 11 and 18 have working points $Tw(°C.)$ and softening points $Ts(°C.)$. Specifically, the glass rod 25 has $Tw1$ and $Ts1$, the glass rod 11 has $Tw2$ and $Ts2$, and the glass rod 18 has $Tw3$ and $Ts3$. The following relationships should be observed: $Tw1-Ts1 \approx 200$, $Tw2-Ts2 \approx 200$, $Ts1 \geq Tw2$, and $Ts2 \geq Tw3$. In the sputtering process shown in FIG. 7, the sputtering glass to form a glass layer 24 should have the softening point $Ts$ which is equal to or slightly higher than the softening point $Ts1$ of sealing glass 25. Otherwise, the glass layer cannot be in close contact with the second magnetic material 22.

This is because if the glass used in the first glass bonding process has the softening point $Ts1$ which is lower than the working point $Tw2$ of the glass in the second glass bonding process, the glass 26 in the first glass bonding process and the glass layer 24 are softened in the second glass bonding process. This would change the gap width g.

Similarly, when the glass 17a in the second glass bonding process has the softening point $Ts2$ which is lower than the working point $Tw3$ of the glass used in the glass molding process, the glass in the second glass bonding process would be softened in the glass molding process. This would lead to a phenomenon in which the core chip for read/write and erase heads might be bent at the center shield thereof in the shape of an inverted V as shown in FIG. 9.

A difference between the working point $Tw$ and the softening point $Ts$ of a glass rod depends upon the kind of glass. In the case of low temperature glass, the difference is between 100° C. and 200° C. while in the case of high temperature glass, the difference is between 200° C. and 250° C. On the basis of the foregoing relationship, there should be a difference of approximately 400° C. between the working point $Tw1$ of the glass in the first glass bonding process and the working point $Tw3$ of the glass in the glass molding process. Usually, a core chip of a magnetic head in a floppy disk drive is made of manganese zinc ferrite. The manganese zinc ferrite can endure a maximum temperature of 900° without degrading its magnetic characteristics. Therefore, when $Tw1$ is set to maximum 900° C., $Tw3$ inevitably becomes as low as 500° C. The glass with 500° C. $Tw3$ has 400° C. or less $Ts3$, which means that this glass is easily affected by ambient conditions. Therefore, the glass cannot be used in a device such as a floppy disc drive which might be used under severe ambient conditions of high temperatures, high humidity, or extremely low temperatures.

As described above, the first method using the organic adhesive to bond the sliders and core chip is prone to problems of less reliable bonding, sorting work due to the CS level differences, and increase of the manufacturing cost. The second method using the glass comprises three steps, i.e. the first and second glass bonding processes and the glass molding process, as well as a step of making core chips, and selection of the glass to be used is difficult because softening points thereof are relatively limited.

SUMMARY OF THE INVENTION

It is therefore an object of the invention to provide a method of manufacturing, at a reduced cost, a magnetic head which has few CS level differences and is applicable to any ambient conditions, thereby reducing the GD processing steps, minimizing stocks, ensuring high quality, and improving the reliability of glass used in the glass molding process.

According to a first aspect of the invention, there is provided a method of manufacturing a magnetic head having a predetermined gap kept between first and second magnetic materials, comprising the steps of: (a) forming on the first magnetic material a silicon dioxide layer as thick as a width of the gap; (b) diffusing alkali metal on the surface of silicon dioxide layer; and (c) bonding the first and second magnetic materials with the silicon dioxide layer sandwiched therebetween.

In the step (a), the silicon dioxide layer is formed by vacuum evaporation.

In the step (b), the first magnetic material bearing the silicon dioxide layer is dipped in a solution containing alkali metal ions for a predetermined period of time.

In the step (b), ultrasonic vibrations are applied to the solution containing the alkali metal ions.

The alkali metal is sodium, and the solution is sodium bicarbonate.

The alkali metal is potassium, and the solution is potassium bicarbonate.

In a second aspect of the invention, there is provided a method of manufacturing a magnetic head having a predetermined gap kept between first and second magnetic materials, comprising the steps of: (a) forming a silicon dioxide layer on each of the first and second magnetic materials so that a total thickness of the silicon dioxide layers is equal to a width of the gap; (b) diffusing alkali metal onto the surfaces of the silicon dioxide layers; and (c) bonding the first and second magnetic materials with the silicon dioxide layers sandwiched therebetween.

According to a third aspect of the invention, there is provided a method of manufacturing a magnetic head including a read/write head and an erase head, comprising the steps of: (a) forming on first magnetic materials silicon dioxide layers having a predetermined thickness; (b) diffusing alkali metal onto surfaces of the silicon dioxide layers; (c) bonding the first magnetic material and second magnetic materials with the silicon dioxide layers sandwiched therebetween so as to make bar materials; (d) processing bar materials into a predetermined shape so as to make a read/write head; (e) processing the bar material into another predetermined shape so as to make an erase head; (f) bonding the read/write head and erase head so as to obtain a core material; and (g) slicing the core material to obtain a magnetic head core chip blank having the read/write and erase heads.

In steps c) and f), glass is melted at a substantially equal temperature and solidified so as to make the bar material, and make the core material, respectively.

According to a first aspect of the invention, an $SiO_2$ glass layer is formed on one surface of at least either a first or second magnetic material, so that glass having a relatively high fusing point can be used in the glass bonding and molding processes.

First of all, use of such glass permits the gap width to remain the same even after the glass bonding and molding processes, and prevents the core chip from being flexed at the center shield. Thus, the present invention provides a magnetic head whose gap width is very precise and assures excellent azimuth precision.

Secondly, the core chip and sliders are not joined by the organic adhesive but by glass, so that the magnetic core is free from the displacement. Further, since the sliders and core chip are aligned on the same level to be processed, the magnetic head is free from spacing loss which will reduce the electromagnetic conversion characteristics, and has excellent quality.

Thirdly, all the components are joined by glass without using the organic adhesive. The glass used in the glass molding process may have a relatively high softening point of 470° C., which makes the magnetic head resistant to heat and humidity.

Fourthly, the glass having substantially the same working point can be used in the first and second bonding processes, which would simplify these processes. For instance, it is possible to carry out the first and second bonding processes in a heat treatment furnace.

Fifthly, glass rods having substantially the same working points can be used in the first and second bonding process. Since the first glass bonding process can be performed at the working point of 900° C. or less, magnetic characteristics of ferrite are not reduced in the first glass bonding process.

Sixthly, a softening point Ts4 of a thin glass plate used in the second glass bonding is 50° C.~150° C. higher than the softening point Ts2 of a glass rod having an oval section, so that the center shield can be precisely formed in the second glass bonding process.

Seventhly, in the glass molding process, the core chip blank is simply fitted into a long opening on the slider so that the gap between the core chip and the slider, and a track center position and azimuth of the magnetic head can be determined automatically. This makes the bonding and molding jobs very simplified without use of expensive positioning jigs or measuring instruments.

Finally, no sorting of core chips and sliders is required in the glass molding process since they have few CS level differences. This not only reduces the number of processes but also protects the magnetic heads against damages, cracks, chipping, and residual distortion which are fatal to the magnetic heads.

DESCRIPTION OF PREFERRED EMBODIMENT

The invention will be described hereinafter with reference to a preferred embodiment of the invention shown in drawing figures. The second glass bonding process and the glass molding process are the same as the prior art, so that reference is made to FIGS. 8 and 5. A detailed description thereof will be omitted here.

Figure 10A:
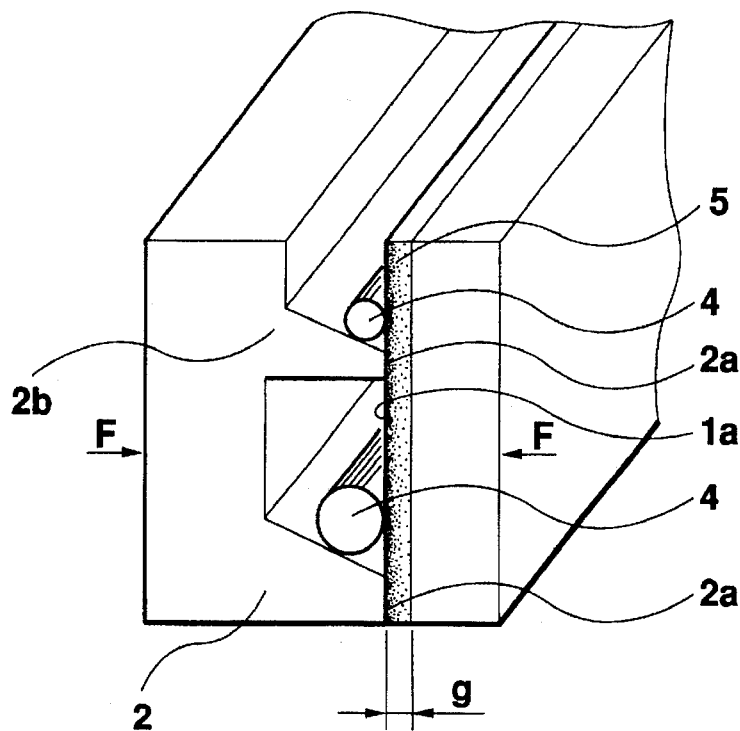
FIG. 10A is a schematic view showing an example of a first glass bonding process according to the present invention, particularly showing the state of a core chip prior to the first glass bonding process.

Referring to FIG. 10A, in the first glass bonding process, an $SiO_2$ layer is formed on a surface of a first magnetic material $1a$, for a read/write or erase head, by the well-known vacuum evaporation, sputtering, ion-plating or chemical vapor deposition (CVD) process. The $SiO_2$ layer is as thick as a desired gap width g (depending upon the read/write or erase head). Then, the glass-bonded member is dipped in a hot solution of sodium bicarbonate or potassium bicarbonate for a predetermined period of time, so that alkali metal ions such as sodium or potassium are diffused on the surface of the $SiO_2$ layer. Thereafter, the surface of the $SiO_2$ layer will be vitrified.

Figure 7A:
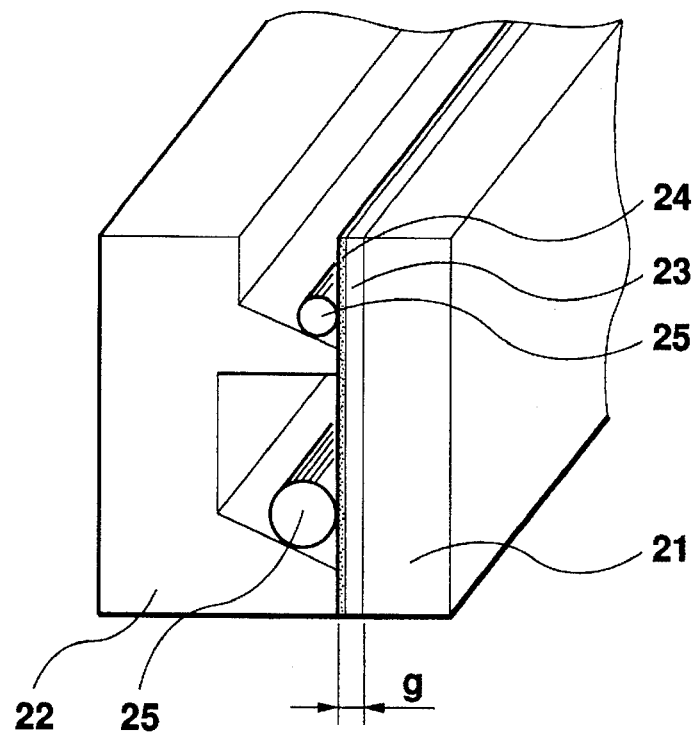
FIG. 7A is a schematic view showing a third example of the first glass bonding process, especially showing a core chip prior to the process.
Figure 7B:
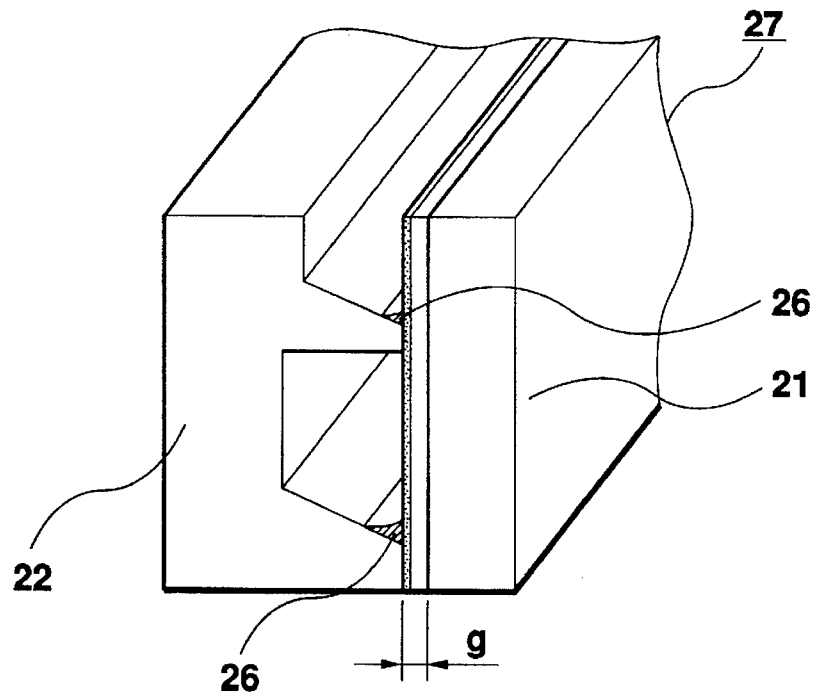
FIG. 7B is a schematic view showing a fourth example of the first glass bonding process, especially showing a glass-bonded state of the core chip.
Figure 11:
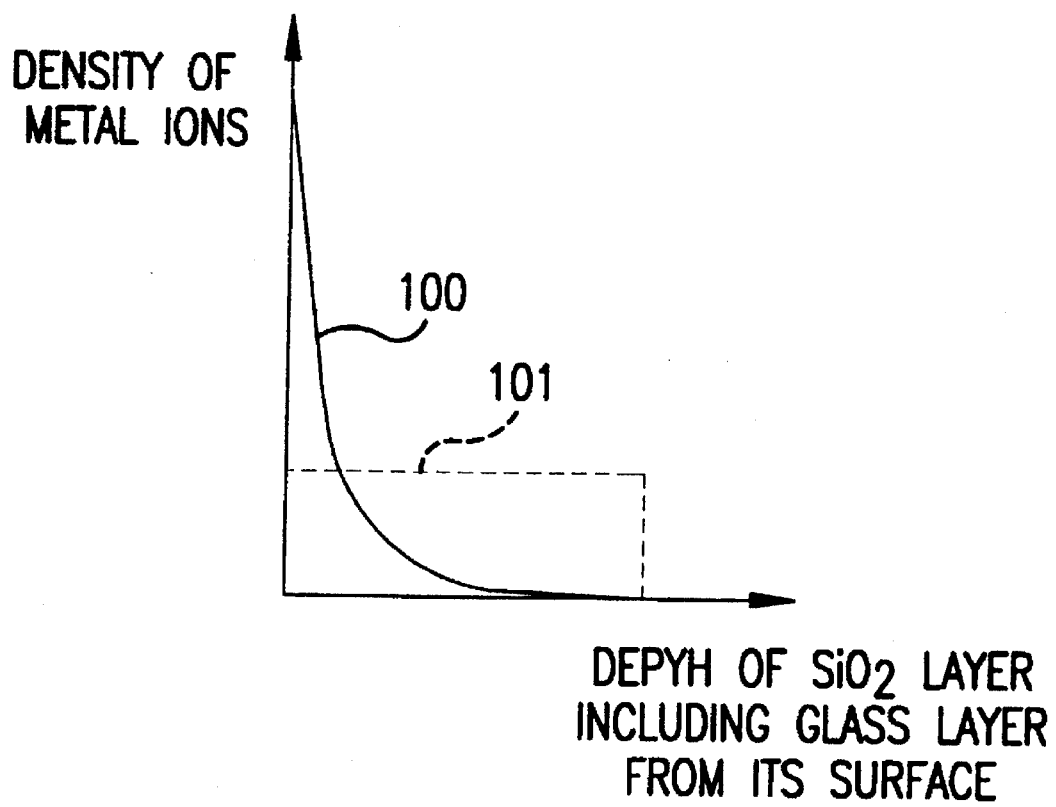
FIG. 11 is a graph showing a relationship between density of alkali metal ions dispersed in an $SiO_2$ layer in an embodiment of the invention.
Figure 10B:
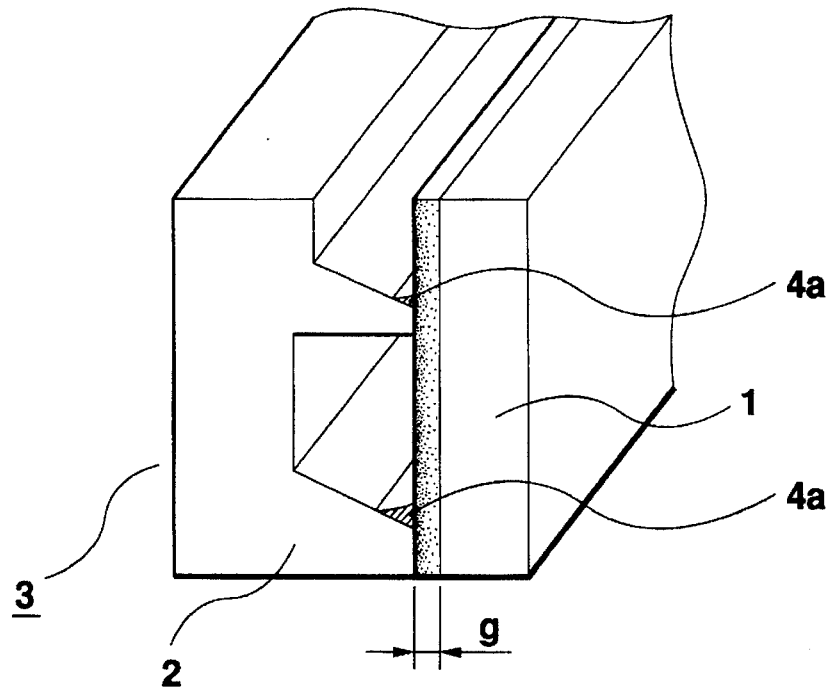
FIG. 10B is a view similar to FIG. 10A, but showing the glass-bonded state of the core chip.

Referring to FIG. 11, the deeper the alkali metal ions permeate into the $SiO_2$ layer, the thinner these ions are as shown by a solid line 100. Further, since a quantity of the diffused alkali ions is very small, a softening point Ts of the glass is slightly lower than a fusing point (1730° C.) of the $SiO_2$ layer, and is always 1000° C. or higher. In FIG. 11, a dashed line 101 denotes a density of metal ions on a glass layer 24 shown in FIG. 7A. Then, the first and second magnetic material 1 and 2 are positioned with their surfaces $1a$ and $2a$ confronting each other via the vitrified $SiO_2$ layer interposed therebetween. The magnetic materials 1 and 2 are pressed with a pressure of several ten to several hundred kilograms/$mm^2$ so as to make the $SiO_2$ layer thinner, and at the same time, the glass rod 4 is heated to between 700° C. and 900° C. and melted, so that the first and second materials 1 and 2 are bonded by the melted glass as shown in FIG. 10B.

The $SiO_2$ layer 5 on the first magnetic material 1 has lots of alkali metal ions very near the surface thereof. A softening point Ts of the $SiO_2$ is approximately equal to the softening point Ts1 of the first glass bonding process. The first magnetic material 1 has a great adhering force to come into contact with the surface $2a$ of the second magnetic member 2. Strictly speaking, the $SiO_2$ layer becomes slightly thinner, i.e. approximately one hundredth of the thickness thereof. Therefore, it is possible to say that the thickness of the $SiO_2$ layer 5 remains substantially the same. Thus, a bar material 3 having a $SiO_2$ layer 5 as thick as the gap width g can be obtained.

The alkali metal at the bonded area of the $SiO_2$ layer 5 and the surface $2a$ of the second magnetic material 2 is further diffused in the first glass bonding process, thereby raising its softening point Ts. The glass rod 4 for the first glass bonding process is assumed to have a softening point Ts1 and a working point Tw1. For example, the glass rod 4 is made of boro silicate, whose coefficient of thermal expansion is $90{\sim}96{\times}10^{-7}$/°C., and softening point Ts1 is 620° C., and working point Tw1 is 830° C.

The second glass bonding process is similar to the conventional process except that a thin glass plate is used in addition to the glass rod 4 in the first glass bonding process. Therefore, only matters related to the glass rod and the thin glass plate will be described here. The glass rod is the same as the glass rod 4, and is assumed to have a softening point Ts2, and working point Tw2. The thin glass plate has a softening point Ts4, and a working point Tw4. The addition of an ingredient such as PbO by 10 to 20 wt. % will make the glass rod have a new Ts2 and a new Tw2 which are approximately 50° C. below the original Ts2 and Tw2. One example of the thin glass plate is boro silicate, and has a coefficient of thermal expansion of $80{\sim}90{\times}10^{-7}$/° C., softening point Ts4 of 730° C., and a working point Tw4 of 950° C.

In the second glass bonding process, the following relationships are established: Tw1–Tw2=0°~50° C.; Ts1–Ts2= 0°~50° C.; Tw4–Tw1=50°~150° C.; Ts4–Ts1=50°~150° C.; Tw4–Tw2=50°~150° C.; Ts4–Ts2=50°~150° C.; and Tw1= 780°~900° C. The gap width accomplished in the first glass bonding process remains the same. This is because the softening point Ts of the vitrified $SiO_2$ layer 5 is much higher than the working point Tw2 in the second glass bonding process. Glass 4 used in the first bonding process is confined in its position even when it is softened.

The foregoing glass rod has a viscosity of approximately $10^4$ poise at the working point Tw2, and is so fluid that it can flow into the track regulating grooves and the minute gap in the first and magnetic materials. The thin glass plate has the viscosity of approximately $10^6$ poise, and is less fluid. Thus, the thin glass plate remains at its position without flowing out. Since the first and second magnetic materials are bonded at a very high temperature, a gap formed during the temporary bonding by the adhesive such as "ARON CERAMIC" (trade name) remains as it is after the second glass bonding process.

It is assumed here that the cylindrical glass rod for the glass molding process has a softening point Ts3 glass rod is lead boro silicate glass, whose coefficient of thermal expansion is $100{\sim}105{\times}10^{-7}$/° C., softening point Ts3 is 470° C., and working point Tw3 is 600° C.

In the glass molding process, the following relationships are established: Tw1–Tw2=0°~50° C.; Ts1 –Ts2=0°~50° C.; Tw4–Tw1=50°~150° C.; Ts4–Ts1=50 °~150° C.; Tw4–Tw2=50°~150° C.; Ts4–Ts2=50°~150° C.; Tw2–Tw3= 180°~300° C.; Ts2–Ts3=180°~300° C., and Tw1 =780°~900° C. The gap width accomplished in the first glass bonding process remains the same since the softening point Ts is much higher than the working point Tw in the first molding process.

The core chip blank is never flexed at the center shield. This is because the glass at the center shield has the softening point Ts2 which is much higher than the working point Tw3 of the glass in the glass molding process.

The four types of glass have the following relationships: Tw1–Tw2=0°~50° C.; Ts1–Ts2=0°~50° C.; Tw4–Tw1= 50~150° C.; Ts4–Ts1=50°~150° C.; Tw4–Tw2=50°~150° C.; Ts4–Ts2=50°~150° C.; Tw2–Tw3 =180°~300° C.; Ts2– Ts3=180°–300° C., and Tw1=780°~900°C.

Figure 12:
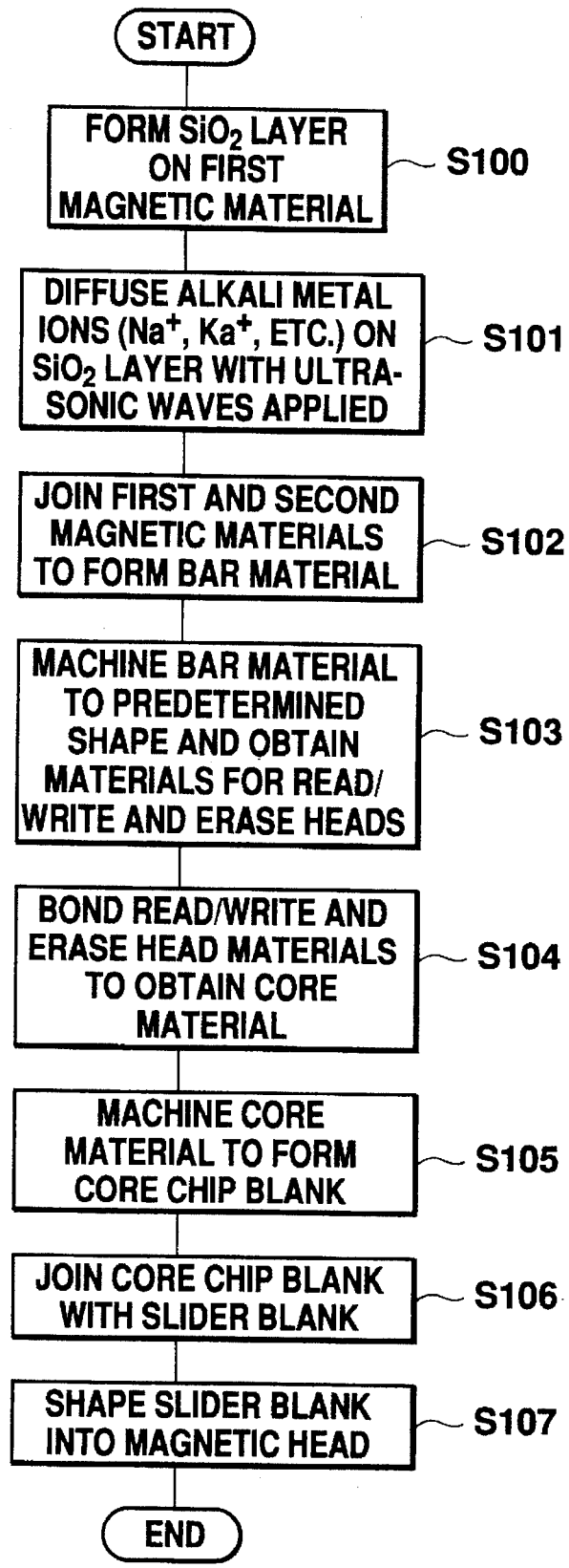
FIG. 12 is a flowchart for carrying out the glass bonding and molding processes according to the invention.

Referring to the flowchart shown in FIG. 12, the method of manufacturing the magnetic head will be described hereinafter. First of all, an $SiO_2$ layer 5 is formed, by the vacuum evaporation method, on the surface $1a$ of the first magnetic material 1 (step S100). This $SiO_2$ layer 5 will be contacted with the second magnetic material 2. Alternatively, the $SiO_2$ layer 5 may be formed using a method such as sputtering, which is however expensive and has poor productivity. In practical use, the vacuum evaporation method is preferable. In the related art shown in FIG. 7A, when forming a glass layer 24 on the $SiO_2$ layer 23, the vacuum evaporation method cannot be used because the $SiO_2$ layer 23 and the glass layer are formed at different fusing points. In such a case, the sputtering method has to be employed although its use is expensive. In this embodiment, a glass layer containing diffused alkali metal ions is formed in the $SiO_2$ layer 5. In other words, since only one $SiO_2$ layer is formed, the vacuum evaporation method is applicable. In this process, the $SiO_2$ layer 5 is made as thick as the gap width g. The vacuum evaporation process should be performed in a manner such that alkali metal ions should be diffused mainly on the surface of the $SiO_2$ layer 5 and sparsely diffused deep into the SiO$_2$ layer 5. For this purpose, the SiO$_2$ layer 5 should be formed so that it is coarse on the surface thereof and is denser toward the bottom thereof.

In the foregoing method, when initially vacuum-evaporating an SiO$_2$ layer on the first magnetic material, a temperature of a work piece is maintained high (e.g. 200° C. or higher) so as to accelerate the vacuum-evaporation process (e.g. 2~3 mm/sec). This enables the SiO$_2$ layer to stick closely to the first magnetic material. Therefore, the SiO$_2$ layer has a large expansion factor when alkali ions are diffused thereon, so that the layer can be protected against being peeled off from the first magnetic material. As the vacuum evaporation process proceeds, both the temperature of the work piece and the vacuum evaporation speed are reduced continuously or in a phased manner. When the vacuum evaporation process is finished at a speed of 0.5 mm/sec with the work piece kept at 100° C., the alkali ions will be diffused in an ideal state.

The first magnetic material bearing the SiO$_2$ layer 5 thereon is dipped in a solution for melting the alkali metal ions for a predetermined period of time. The solution contains metal ions to be diffused into the SiO$_2$ layer 5. For instance, sodium bicarbonate is used to diffuse sodium into the SiO$_2$ layer 5, while potassium bicarbonate is used to diffuse potassium into the SiO$_2$ layer 5. The alkali metal ions to be used are selected on the basis of factors such as density of the SiO$_2$ layer and cost. If the SiO$_2$ layer 5 has a lot of bubbles therein, the potassium having a relatively large atomic radius can diffuse into the SiO$_2$ layer 5. In such a case, the potassium bicarbonate will be used. Conversely, if the SiO$_2$ layer 5 is dense, the sodium having a small atomic radius will be employed. Further, if metal ions having a much smaller atomic radius are required, lithium will be used.

When the magnetic material 1 is dipped in the solution, a solution tank is preferably subject to ultrasonic vibrations (Step S101) which are produced by a piezoelectric transducer installed in the tank, which will promote the diffusion of the metal ions onto the SiO$_2$ layer 5.

Diffused alkali metal ions are relatively dense near the surface of the SiO$_2$ layer 5, and becomes thinner toward the bottom of the SiO$_2$ layer 5, as shown in FIG. 11. A solid line 100 indicates the density distribution of the alkali metal ions in the present invention, while a dashed line 101 indicates the density distribution of the alkali metal ions in the related art. In the case of the dashed line 101, the alkali metal ions are not distributed in a continuous manner, and are incredibly thin at a certain part of the SiO$_2$ layer. The SiO$_2$ layer becomes very weak at such a part. Especially, when metal ions go into the SiO$_2$ layer, the coefficient of thermal expansion of the SiO$_2$ layer Varies extensively, which would cause the SiO$_2$ layer to be cracked due to a difference of coefficients of thermal expansion. In the embodiment of the invention, the metal ions diffuse mainly on a limited area of the surface of the SiO$_2$ layer 5, and diffuse deep into the SiO$_2$ layer 5 in a continuous manner without a drastic variation at a certain area. Therefore, it is possible to prevent the SiO$_2$ layer 5 from being cracked. A percentage content of the metal ions is kept as small as possible throughout the SiO$_2$ layer. Therefore, a softening point of the SiO$_2$ 5 layer with metallic ions can be substantially equal to the softening point of the SiO$_2$ layer itself. After the alkali ion diffusion process, the first magnetic material is rinsed and dried.

Next, the first and second magnetic materials 1 and 2 are bonded with the SiO$_2$ layer 5 sandwiched therebetween (step S102). In this glass bonding process, the glass rod 4 is melted, cooled, and solidified again. In this case, the glass rod 4 is melted at a softening point which is slightly below the softening point of the SiO$_2$ layer 5, thereby preventing the SiO$_2$ layer 5 from being melted, and reliably maintaining the gap g. Further, in this process, only the surface of the SiO$_2$ layer 5 where the alkali metal ions are dense is melted, so that the SiO$_2$ layer 5 can be completely bonded to the surface 2a of the second magnetic material 2.

The first and second magnetic materials 1 and 2 which are bonded by the glass rod 4 and the glass layer on the SiO$_2$ layer 5 will be called "a bar material" hereinafter.

Figure 8:
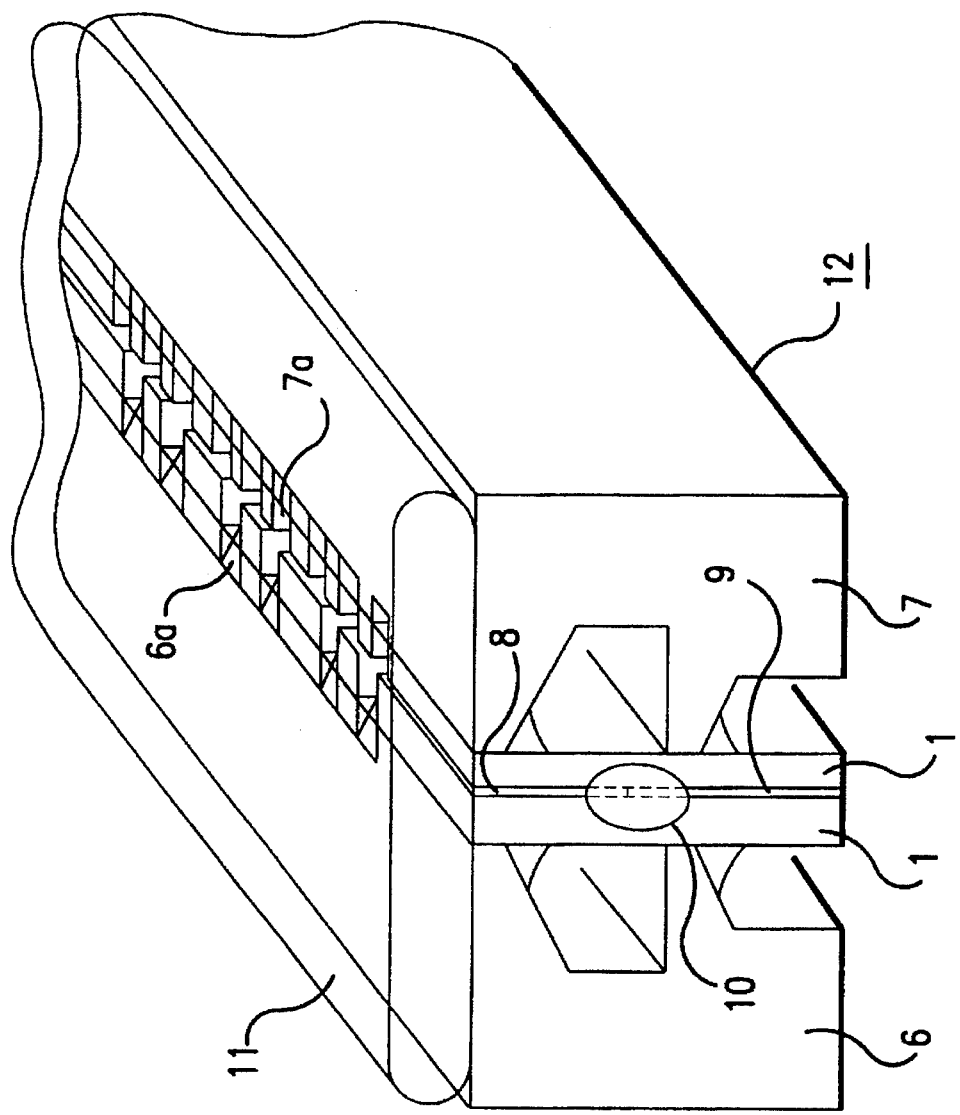
FIG. 8 is a schematic view showing a second glass bonding process in a conventional magnetic head.
Figure 9:
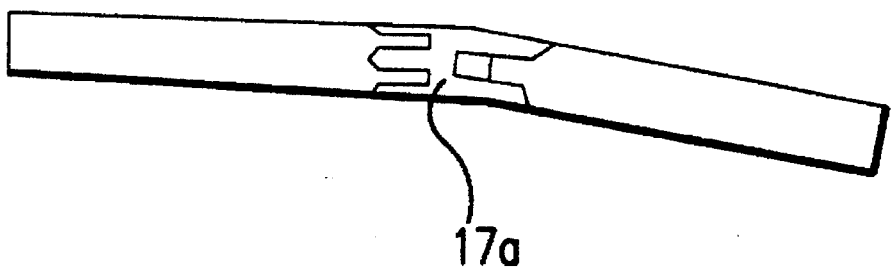
FIG. 9 shows a core chip whose bonded portion is deformed.

The bar material will be processed into a predetermined shape (step S103). Specifically, grooves 6a and 7a will be formed on the bar material as shown in FIG. 8. The grooves 6a and 7a depend upon materials used for the read/write and erase heads. After this process, the processed materials are called "a read/write head material" and "an erase head material", respectively. The read/write head material and the erase head material will be bonded back to back (step S104). The glass in step S104 has a softening point which is slightly lower than that of the glass in step S102. Since the glass in step S102 has a relatively high softening point, glass which is resistive to ambient conditions such as humidity and temperature can be used in this process. A member obtained in the foregoing process is called "a core material".

Figure 1:
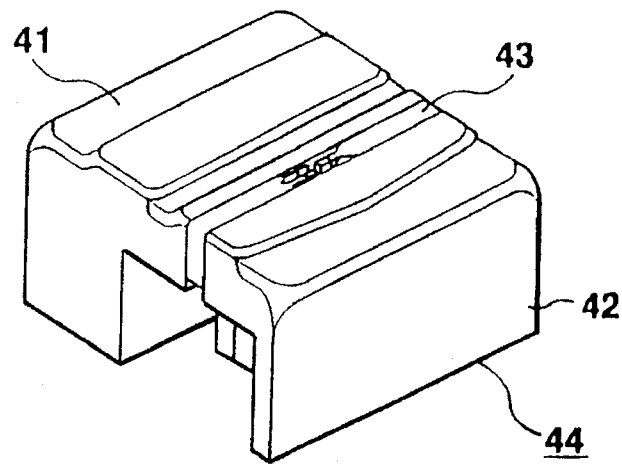
FIG. 1 is a perspective view of a magnetic head incorporating a conventional two-piece type slider.
Figure 2:
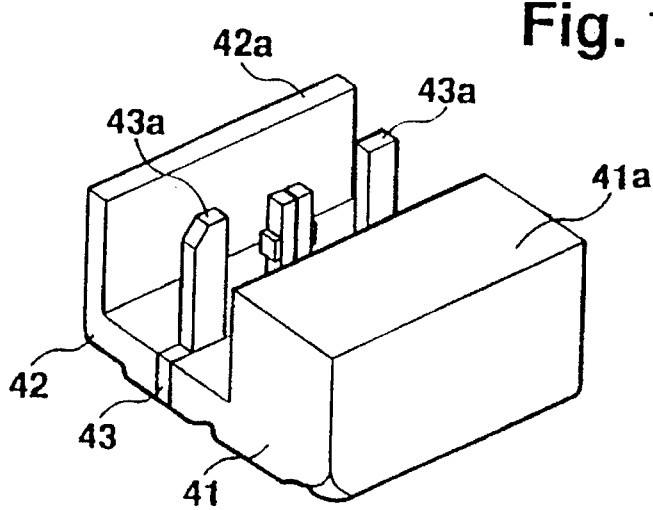
FIG. 2 is a view similar to FIG. 1 but showing the magnetic head in an inverted state.
Figure 3:
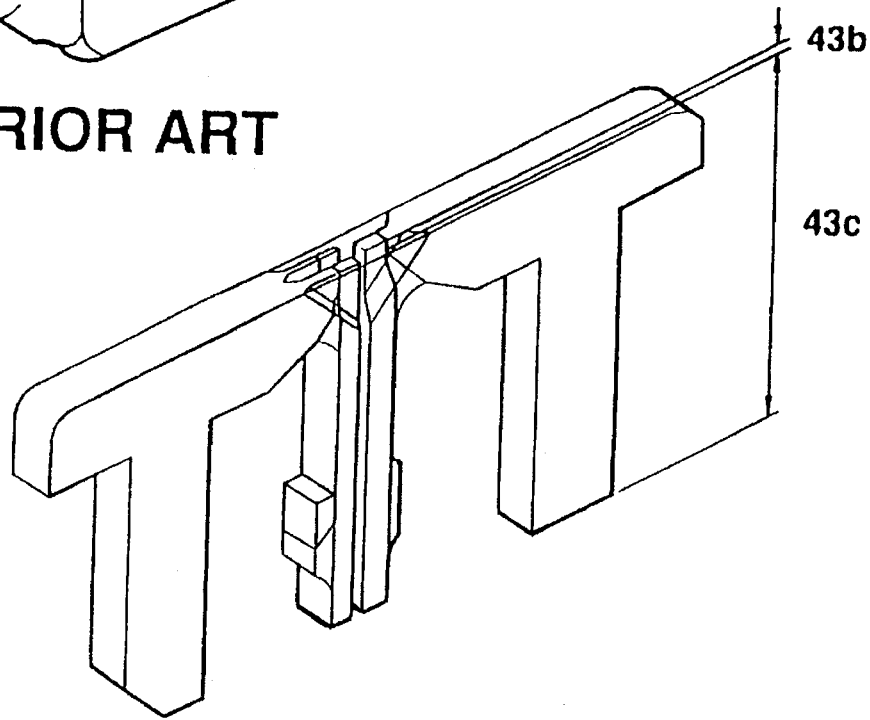
FIG. 3 is an exploded perspective view of a magnetic head core.
Figure 4:
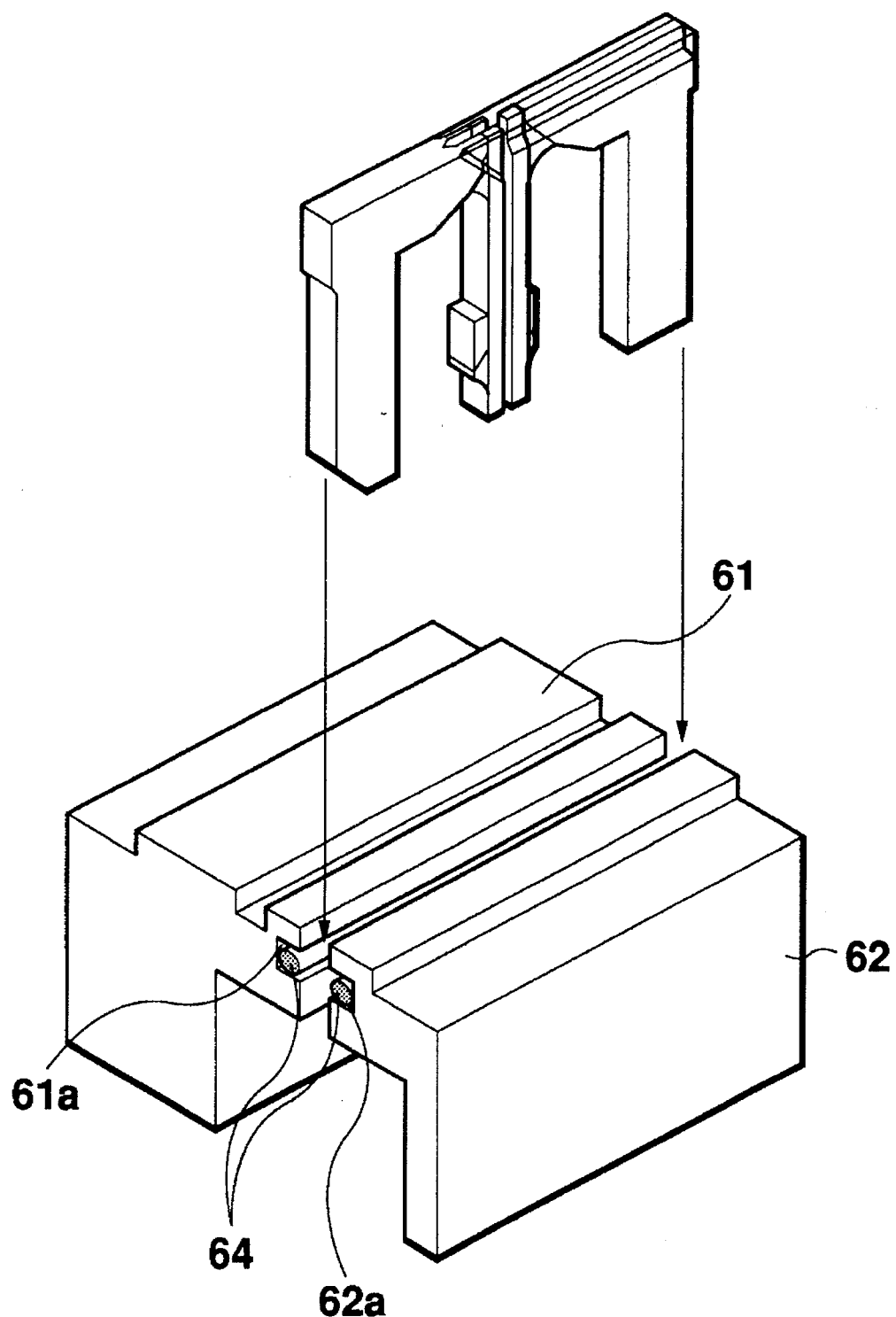
FIG. 4 is an exploded perspective view of a core including a two-piece slider, particularly showing that the core chip and sliders are joined by glass.
Figure 5:
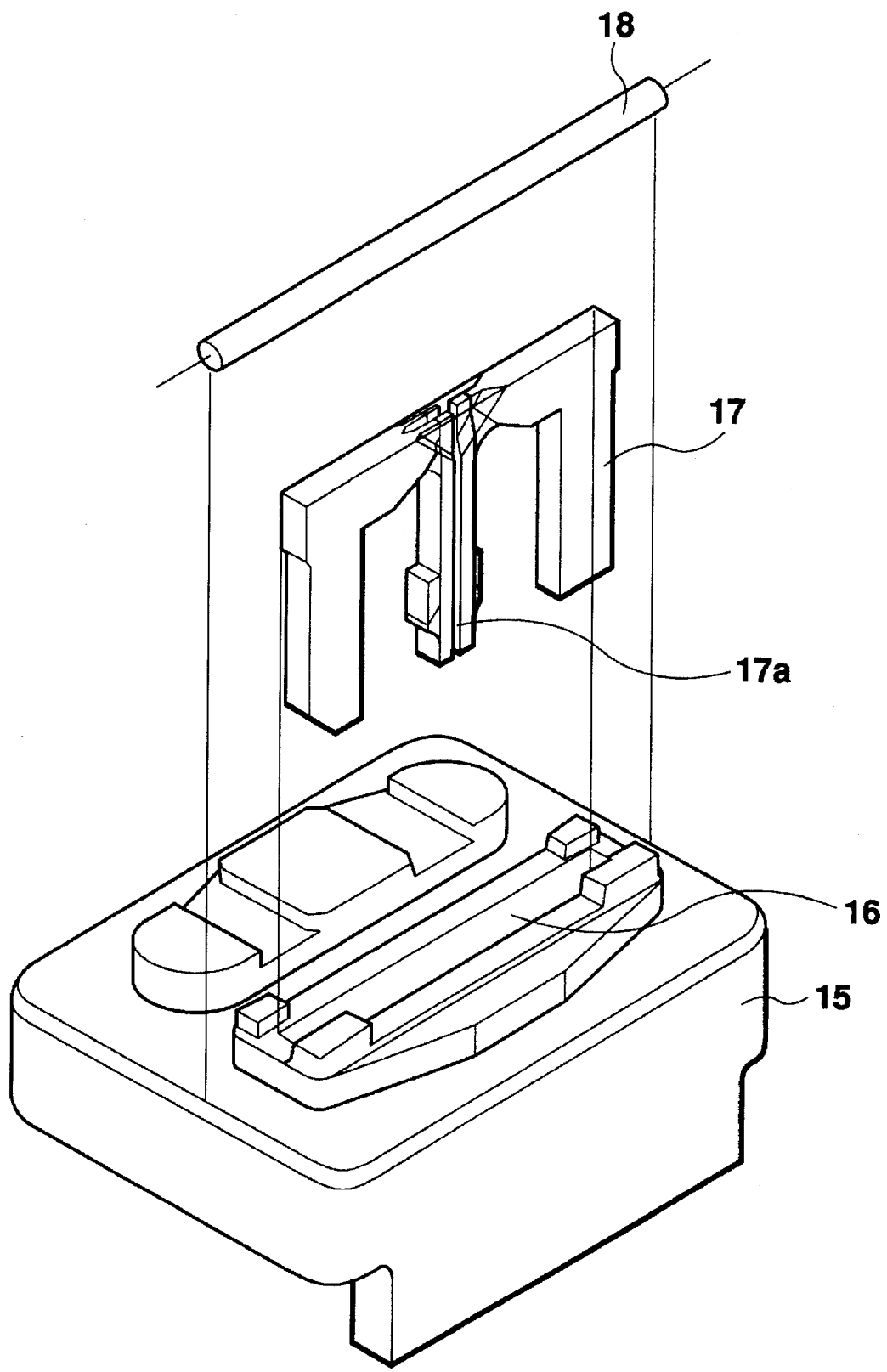
FIG. 5 is a schematic view showing a glass molding process for a magnetic head including a conventional one-piece slider.
Figure 6A:
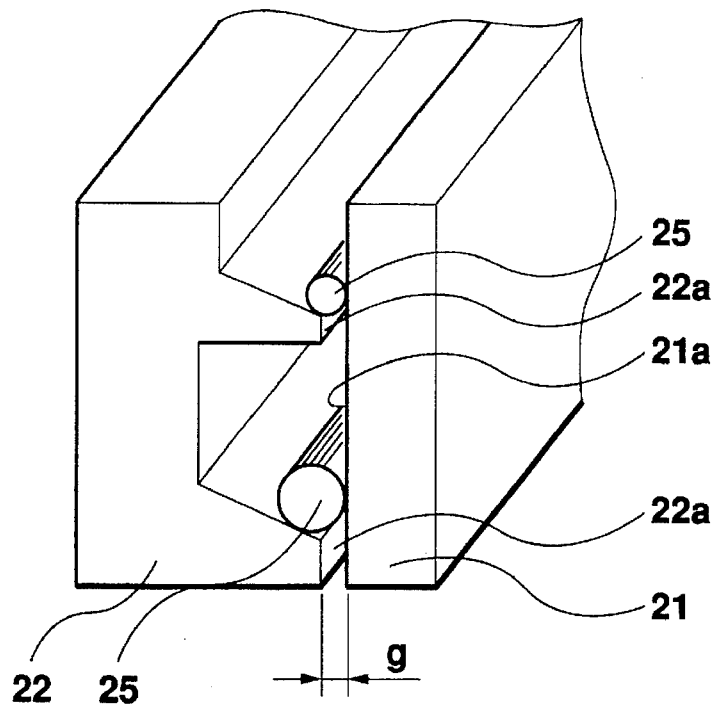
FIG. 6A is a schematic view showing a first example of a first glass bonding process, especially showing a core chip prior to the process.
Figure 6B:
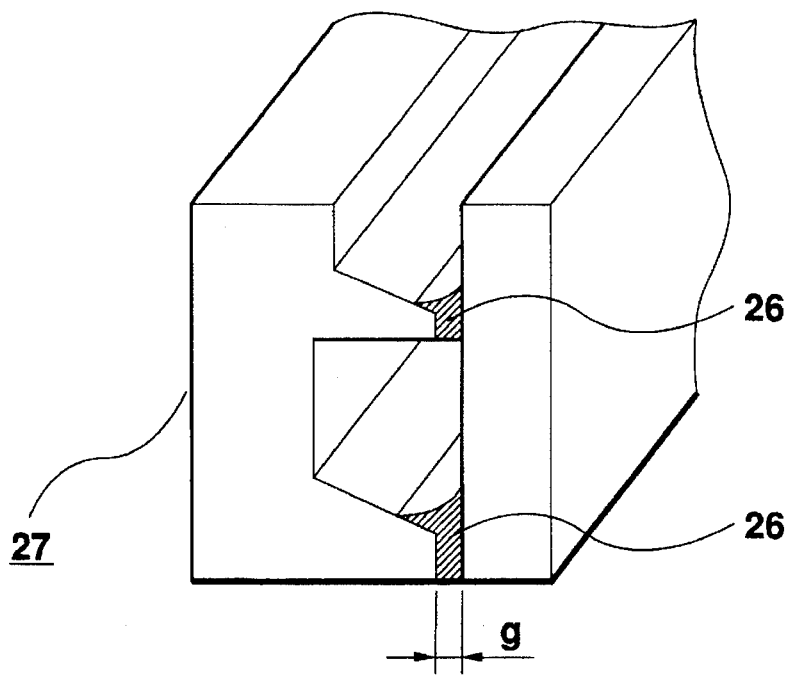
FIG. 6B is a schematic view showing a second example of the first glass bonding process, especially showing a glass-bonded state of the core chip.

The core material is processed into a predetermined shape, thereby obtaining a core chip blank (step S105). In this process, the core material is sliced to remove a reinforcement 2b of the second magnetic material 2. The core chip blank is then fitted into a one-piece slider as shown in FIG. 5, and is bonded by melted glass. Since the glass rods in the foregoing two glass bonding process have relatively high softening points, the glass in this process can also have a relatively high softening point. Therefore, the glass is compatible in various ambient conditions. Thereafter, the bonded core blank and slider are polished into a magnetic head of a predetermined shape (Steps S107).

According to the invention, the SiO$_2$ layer is formed on the first magnetic material. Alternatively, the SiO$_2$ layer may be formed on the second magnetic material. Further, it is possible to form the SiO$_2$ layer on surfaces of both the first and second magnetic materials. In this case, the SiO$_2$ layers have respective thicknesses which total up to the gap width g.

What is claimed is:

1. A method of manufacturing a magnetic head having a predetermined gap kept between first and second magnetic materials, comprising the steps of:

(a) forming on the first magnetic material a uniformly consistent silicon dioxide layer as thick as a width of the gap;

(b) diffusing alkali metal on the surface of said silicon dioxide layer;

(c) bonding the first and second magnetic materials with the silicon dioxide layer sandwiched therebetween; and (d) processing said bonded first and second magnetic materials with the silicon dioxide layer to obtain said magnetic head.

2. A method as in claim 1, wherein in the step (a), the uniformly consistent silicon dioxide layer is formed by vacuum evaporation.

3. A method as in claim 1, wherein step (b) comprises dipping the first magnetic material bearing the silicon dioxide layer into a solution containing alkali metal ions for a predetermined period of time.

4. A method as in claim 3, wherein in the step (b), ultrasonic vibrations are applied to the solution containing the alkali metal ions.

5. A method as in claim 3, wherein the alkali metal is sodium, and the solution is sodium bicarbonate.

6. A method as in claim 3, wherein the alkali metal is potassium, and the solution is potassium bicarbonate.

7. A method of manufacturing a magnetic head having a predetermined gap kept between first and second magnetic materials, comprising the steps of:

(a) forming a uniformly consistent silicon dioxide layer on each of the first and second magnetic materials so that a total thickness of the silicon dioxide layers is equal to a width of the gap;

(b) diffusing alkali metal onto the surfaces of the silicon dioxide layers;

(c) bonding the first and second magnetic materials with the silicon dioxide layers sandwiched therebetween; and (d) processing said bonded first and second magnetic materials with the silicon dioxide layers to form the magnetic head.

8. A method of manufacturing a magnetic head including a read/write head and an erase head, comprising the steps of:

(a) forming a uniformly consistent silicon dioxide layer having a predetermined thickness on a first magnetic material;

(b) diffusing alkali metal onto a surface of the silicon dioxide layer;

(c) bonding the first magnetic material and a second magnetic material with the silicon dioxide layer sandwiched therebetween so as to make a bar material;

(d) processing said bar material into a predetermined shape so as to make a read/write head material;

(e) processing said bar material into another predetermined shape so as to make an erase head material;

(f) bonding the read/write head material and erase head material so as to obtain a core material;

(g) slicing the core material to obtain a magnetic head core chip blank having the read/write and erase heads; and (h) processing the magnetic head core chip blank to obtain the magnetic head.

9. A method as in claim 8, wherein in step (a), the uniformly consistent silicon dioxide layer is formed by the vacuum evaporation.

10. A method as in claim 8, wherein in step (b) comprises dripping the first magnetic material into a solution containing alkali metal ions for a predetermined period of time.

11. A method as in claim 8, wherein step (c) comprises melting and solidifying glass to make the bar material.

12. A method as in claim 8, wherein step (f) comprises melting and solidifying glass to make the core material.

* * * * *